Patented Nov. 16, 1943

UNITED STATES PATENT OFFICE 2,334,236

COATED CELLULOSIC MATERIAL

Harold W. Arnold, Marshallton, and George L. Dorough and George H. Latham, Wilmington, Del., assignors to E. I. du Pont de Nemours & Company, Wilmington, Del., a corporation of Delaware No Drawing. Application December 11, 1940, Serial No. 369,528

7 Claims. (Cl. 117—145)

This invention relates to cellulosic materials coated with vinyl copolymers.

There are many examples in the prior art which show the coating of cellulosic materials of various types with vinyl polymers and copolymers. While many of these coatings are excellent in certain respects most of them have defects which exclude them from general application. For example, while a coating may show good strength, toughness, and flexibility, good resistance to burning, and satisfactory resistance to the action of organic liquids and other reagents, it may be found to show poor adhesion for the substrate. Again, a coating may be found to show satisfactory strength, toughness, and adhesion, but it may show poor resistance to solvents and other reagents, and poor resistance to burning. Other coatings may be satisfactory from the standpoint of physical properties but may be found to have adverse effects on the properties of the substrate.

It is an object of this invention to find a coating material which when applied to a cellulosic material will produce a coating having all of the desired properties of strength, toughness, resilience, flexibility and good adhesion to the substrate. Another object is to find a coating composition which on coating a cellulosic material has in addition to the above properties good resistance to organic liquids and is non-inflammable. Still another object is to find a coating composition which when applied to a cellulosic material does not cause any deterioration of the substrate.

These objects are accomplished by the following invention which comprises coating cellulosic materials with copolymers of unsymmetrical dichloroethylene and polymerizable vinyl or vinylidene compounds having a single

group. The polymerizable vinyl or vinylidene compounds used in this invention all fall under the general formula

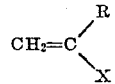

where R is hydrogen, halogen or a saturated aliphatic radical and X is one of the following groups: —Cl, —Br, —F, —NO, —NO₂, —CN, —C₆H₅, —C₁₀H₇, —COOH,

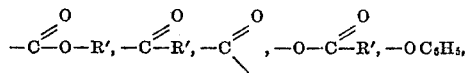

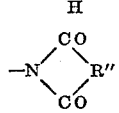

—CONH₂, —CONH—R', —CONR'₂, —SO₃H, —COCl, —COBr, in which R' is alkyl and R" is alkylidene, all of which can be classed as negative groups devoid of carbon to carbon unsaturation. In the copolymer the dichloroethylene should be present in an amount from 40 to 80%.

The following examples set forth certain well defined instances of the application of this invention. They are, however, not to be considered as limitations thereof since many modifications may be made without departing from the spirit and scope of this invention.

Example I

Glassine paper is coated with a 25% solution in toluene of a copolymer of unsymmetrical dichlorethylene with 50% vinyl chloride and the coating is dried for ¾ of an hour at 100° C. The resulting coated paper has improved transparency, excellent gloss, satisfactory feel, and good flexibility. It is very water resistant even after long immersion in water. The coated paper burns slowly when held in a flame but does not continue to burn after the flame is removed. Untreated glassine paper burns readily under the same conditions and continues to burn after removal of the flame. The coated paper shows good resistance to creasing. Samples of both creased and uncreased coated paper show greatly improved resistance to penetration by peanut oil. When a number of sheets of coated paper are stacked up, weighted, and the pile heated to 49° C. practically no sticking together occurs.

Example II

A sheet of regenerated cellulose film containing no plasticizer and no moistureproofing layer is coated with a 25% solution in toluene of a copolymer of unsymmetrical dichloroethylene with 50% vinyl chloride. The resulting sheet is baked for several hours at 100° C. The film is clear, and has excellent feel and flexibility. The copolymer coating cannot be rubbed or peeled off even after it has been soaked in water for 4 hours. When a sample of commercial cellulose sheet having a moistureproof coating is similarly soaked in water, the moistureproofing coating can be easily rubbed or peeled off.

Example III

A filled, rubbed, and stained mahogany panel is coated on one section with a 20% solution of an unsymmetrical dichloroethylene-vinyl chloride copolymer containing 50% vinyl chloride in a solvent mixture containing 2 parts of butyl acetate, 1 part of acetone and 1 part of toluene. The coating is allowed to dry for about 1 hour and then a second coat is applied. The panel is coated in a like manner on another section with a 20% solution of a copolymer of unsymmetrical dichloroethylene with 40% vinyl chloride, and on third section with a 15% solution in cyclohexanone of a commercial after-chlorinated polyvinyl chloride. The panel is then baked at 80° C. for several hours. A puddle of 95% ethanol is then poured on each of the coated sections of the panel and a small beaker set in the middle of each puddle. After 16 hours the coatings are found to be entirely unaffected. The alcohol treatment can be repeated without any visible effect on the coatings. However, after the completion of the tests it is observed that the portion of the mahogany coated with the commercial after-chlorinated polyvinyl chloride has undergone extensive "grain-bleaching," whereas the sections coated with the unsymmetrical dichloroethylene copolymers are entirely unaffected. Furthermore, large sections of the commercial after-chlorinated polyvinyl chloride films can be peeled from the wood without difficulty, whereas the coatings of the unsymmetrical dichloroethylene copolymers adhere very tenaciously.

Example IV

A detached film of an unsymmetrical dichloroethylene-vinyl chloride (50%) copolymer containing 3% phenoxypropylene oxide as stabilizer is pressed onto a piece of unbleached muslin at 120° C. with a pressure of approximately 300 lbs./sq. in. A small strip of the coated cloth is attached to another piece of unbleached muslin by pressing with a hot iron. The adhesion between the two pieces of muslin is good, and is unaffected by soaking in water for two hours.

Example V

A strip of cardboard of the type used in the construction of paper milk containers is coated at one end with a 17.5% solution in dioxan of a product formed by the copolymerization of unsymmetrical dichloroethylene with 40% vinyl acetate, and then is baked at 100° C. for 30 minutes. The strip is bent into the shape of a ring and the coated portion brought into contact with the uncoated end. Union is effected by manual pressure at a temperature of 140° to 145° C. The resulting seal shows excellent adhesion and the paper rather than the seal tears when a pulling pressure is applied. The cardboard ring is then immersed for three minutes in a paraffin bath maintained at 100° C. There is no indication that the bond is weakened by this treatment, and after the ring is removed from the paraffin bath the seal again can not be broken by the application of a pulling force.

Example VI

A roll of sateen cloth is coated by means of a continuous calendering operation with a copolymer of unsymmetrical dichloroethylene and 50% vinyl chloride containing 3% epichlorohydrin as stabilizer. The resulting coating produces enhanced flame resistance and likewise shows excellent resistance to 1:1 nitric acid, 1:1 sulfuric acid, 1:1 hydrochloric acid, mineral oil, olive oil, gasoline, 5% phenol, and alcohol.

Example VII

Rubbed and stained mahogany panels are treated with 4 coats each of products prepared by the copolymerization of unsymmetrical dichloroethylene with 30% methyl vinyl ketone and with 50% methyl methacrylate, respectively. The methyl vinyl ketone copolymer is applied in the form of a 25% solution in dioxan, while the methyl methacrylate copolymer is applied as a 27.7% solution in a mixture of equal parts of toluene and butyl acetate. The coatings are air dried for several days. Small pools of 95% ethanol are placed on the coated panels and small flasks are placed in the alcohol pools. After approximately 16 hours at room temperature neither coated panel appears to have undergone any visible change. The adhesion of both coatings to the wood is excellent.

In the practice of this invention cellulosic materials are coated with solutions containing copolymers of unsymmetrical dichloroethylene with such materials as vinyl acetate; vinyl propionate; vinyl chloroacetate; vinyl chloride; vinyl bromide; methyl or butyl acrylates; methyl, isobutyl, methoxyethyl, chloroethyl, or 2-nitro-2-methyl-propyl methacrylates; methyl or octyl alpha-chloroacrylates; methyl vinyl ketone; methyl isopropenyl ketone; acrylonitrile; methacrylonitrile; styrene; vinyl naphthalene; ethyl vinyl ether; butyl vinyl ether; N-vinyl phthalimide, N-vinyl succinimide, N-vinyl carbazole, methylene diethyl malonate, and the like or mixtures of two or more of these compounds. It is preferred that the copolymers shall contain from 40 to 80% dichloroethylene. Copolymers within this range have the desirable properties of good strength, toughness, flexibility, adhesion, nonflammability, stability, and resistance to common reagents and a number of organic liquids such as aliphatic hydrocarbons, alcohols, vegetable and mineral oils, and the like. Copolymers containing less than 40% unsymmetrical dichloroethylene show properties approaching those of the unmodified polymer of the non-dichloroethylene constituent. The copolymers containing more than 80% unsymmetrical dichloroethylene are in general too insoluble to be coated on a cellulosic material from solution and application from emulsion is likewise difficult because of the tendency to produce non-continuous films. Furthermore, copolymers containing more than 80% unsymmetrical dichloroethylene tend to show a pronounced instability to heat and, if the attempt is made to apply the coating by hot pressing, the hydrogen chloride which is evolved by thermal decomposition may have an undesirable tendering effect on the cellulosic substrate.

Certain of the copolymers are particularly desirable for use in accordance with this invention. These copolymers form a coating that has an unusually high degree of softness and flexibility. Within this class fall the copolymers of unsymmetrical dichloroethylene with vinyl chloride, vinyl acetate, methyl vinyl ketone, higher methacrylates (propyl and higher), acrylates, methyl acrylonitrile and acrylonitrile. The preferred copolymer is that of unsymmetrical dichloroethylene with vinyl chloride, said vinyl chloride being present in an amount from 20 to 60% in said polymer. This type of polymer is readily soluble in common solvents such as toluene, acetone, etc.; also it adheres well to cellulosic substrata and has good alcohol resistance. In the case of the interpolymers of unsymmetrical dichloroethylene with vinyl acetate and with methyl vinyl ketone, it is preferred to have the latter ingredients in amounts in the polymer of from 20 to 40%. Such polymers are readily soluble in the common solvents, show good adhesion, and form a soft, very tough, stretchable and elastic film. The copolymers in which the higher methacrylates or acrylates are used have like properties and it is preferred that they be present in the polymer in an amount from 30 to 50%. In the case of the copolymers containing as one of the polymeric constituents methyl acrylonitrile or acrylonitrile, it is preferred to have such compounds present in an amount within the range of 20 to 30%. These last two mentioned copolymers, while having the desired properties of the others of flexibility and strength, are not quite as soluble in the common solvents, acetone, however, being the best solvent for use with them. In comparison with the above type of copolymers such interpolymers as vinyl chloride with vinyl acetate or vinyl chloride with methyl acrylate are relatively hard and flexible and tend to impart boardiness to the articles on which they are coated unless a plasticizer is incorporated with them.

It is preferred to apply the copolymers from solutions in organic solvents such as ketones, aromatic hydrocarbons, esters, dioxan, or chlorinated hydrocarbons. The solution may be applied by dipping the cellulosic material in the solution or by flowing, brushing, spraying or spreading the solution upon the cellulosic material. The application may be in one coat or in several coats depending on the thickness of the coating desired. After each coat is applied the film is dried sufficiently to remove most of the solvent. The solids content of the solution will depend upon the solvent used and upon the particular copolymer dissolved in this solvent. For any given solvent-copolymer combination the viscosity of a solution of given strength will depend primarily on the molecular weight of the copolymer. In general, solutions having solids contents of 10 to 50% will have suitable viscosities for flowing, brushing, spraying, or spreading. If it is desired to coat a porous cellulosic substrate without obtaining excessive impregnation the cellulosic substrate may be coated by preforming a sheet of the intercopolymer and attaching it to the substrate by means of heat and pressure. This may be done with a cellulosic substrate which is in the form of a continuous roll, by a continuous calendering operation.

The unsymmetrical dichloroethylene copolymers may be prepared by any of the known polymerization methods such as emulsion, "granular," bulk, and solution. These methods are described in detail in the application of Harold W. Arnold, Serial No. 220,010.

Among the materials which may be coated are paper, for example, tissue paper, book paper, hard finished paper, crepe paper, wrapping paper, cardboard, wallboard, and boxboard; wood, for example, mahogany, oak, maple, cherry, walnut, pine, and ebony; regenerated cellulose sheeting; cotton textiles, for example, cotton voile, cotton duck, cotton muslin, cotton flannel, cotton broadcloth, and the like; rayon crepe fabric and rayon fabrics of various other types, straw, reed, palm leaves, and the like. Specific articles to which the copolymer coatings may be applied are furniture, plywood, wooden tanks, paper containers for liquids, transparent wrappings for food stuffs and other articles, seat cushions, automobile top materials, curtains, awnings, tarpaulins, umbrellas, protective clothing, bookbindings, sails, and the like.

It has been found preferable to apply the copolymers of this invention to compounds of the class consisting of regenerated cellulose devoid of waterproof coating, wood and paper. These copolymers when applied to regenerated cellulose have excellent adhesion, improve the feel and handle of the material as well as improving its gloss. They make the substrata fire-resistant so that it can be used in the application from which it would ordinarily be barred because of its tendency to burn; they have a definite waterproofing effect, cutting down penetration by liquids and vapors; and the coating greatly improves the strength, toughness, and resistance to wearing of the material treated.

In the case of the application of the copolymers to wood they are particularly beneficial as they are resistant to alcohol and hence to alcohol beverages. Thus they may be used to protect the wood from deterioration by such substances. They adhere tenaciously, are shock resistant, and hence do not chip off when given a sharp blow. They improve the resistance of the wood to burning and charring and hence provide a protection against the scars to furniture caused by lighted cigars, cigarettes, or matches. They do not become sticky in hot humid weather and hence can be used for the covering of furniture that is to be sat on. The use of copolymers on paper improves the resistance of the paper to the penetration of water, oils, fats, food juices, milk, etc.; hence, it has a definite waterproofing effect. As in the case of regenerated cellulose, it has a fire resistant effect on the paper. In addition, it greatly improves the strength of the paper and the coating adheres to the paper with great tenacity.

In addition to application of the copolymers from solution in organic solvents, the copolymers may also be applied from aqueous emulsion, particularly if it is desired that considerable penetration of the unsymmetrical dichloroethylene copolymer into the cellulosic substrate shall take place. One of the more commonly applied methods of polymerization involves polymerizing the monomeric mixture in the presence of an aqueous solution containing an emulsifying agent and a polymerization catalyst. Ordinarily the emulsions thus produced are quite stable over protracted periods of time and in many instances they dry to continuous films. Such emulsions are suited to the coating of cellulosic materials.

Another method of application which is frequently desirable when dealing with a thin flexible cellulosic substrate involves joining a preformed thin sheet of copolymer to the substrate by means of heat and pressure as in the case of calendering.

For some coating purposes it may be desirable to add to the copolymer such materials as plasticizers, stabilizers, pigments, dyes, drying oils, and other natural or synthetic resins.

A number of specific uses for the copolymer coated cellulosic materials have already been cited in a previous paragraph. In general, coatings of the unsymmetrical dichloroethylene copolymers will be found valuable wherever toughness, flexibility, non-flammability, and resistance to water, oil, and chemicals are desired. In many cases the copolymer coatings may serve as adhesives for joining the cellulosic substarta to non-cellulosic fabrics, to metals, to leather, to glass, or to natural or synthetic rubber.

It is apparent that many widely different embodiments of this invention may be made without departing from the spirit and scope thereof and therefore it is not intended to be limited except as defined in the appended patent claims.

We claim:

1. A cellulosic material coated with a copolymer of unsymmetrical dichloroethylene and at least one different polymerizable compound containing a methylene group attached by an ethenic double bond to a carbon which is in turn attached to a negative group devoid of carbon-to-carbon unsaturation, the said unsymmetrical dichloroethylene being present in said copolymer in an amount of from 40 to 80%.

2. The product in accordance with claim 1 characterized in that the cellulosic material is regenerated cellulose.

3. The product in accordance with claim 1 characterized in that the cellulosic material is wood.

4. The product in accordance with claim 1 characterized in that the cellulosic material is paper.

5. A regenerated cellulose material coated with a copolymer of an unsymmetrical dichloroethylene and vinyl chloride, said unsymmetrical dichloroethylene being present in said copolymer in an amount of from 40 to 80%.

6. Wood coated with a copolymer of an unsymmetrical dichloroethylene and vinyl chloride, said unsymmetrical dichloroethylene being present in said copolymer in an amount of from 40 to 80%.

7. Paper coated with a copolymer of unsymmetrical dichloroethylene and vinyl acetate, said unsymmetrical dichloroethylene being present in said copolymer in an amount of from 40 to 80%.

HAROLD W. ARNOLD.
GEORGE L. DOROUGH.
GEORGE H. LATHAM.